United States Patent
Pereira

(10) Patent No.: US 10,769,807 B1
(45) Date of Patent: Sep. 8, 2020

(54) SYSTEM, METHOD, AND APPARATUS FOR CLOTHING A PET

(71) Applicant: Pet3D Corp, Palm Harbor, FL (US)

(72) Inventor: Fabricio Saab Pereira, Palm Harbor, FL (US)

(73) Assignee: Pet3D Corp, Palm Harbor, FL (US)

( * ) Notice: Subject to any disclaimer, the term of this patent is extended or adjusted under 35 U.S.C. 154(b) by 0 days.

(21) Appl. No.: 16/693,582

(22) Filed: Nov. 25, 2019

(51) Int. Cl.
| | |
|---|---|
| *G06T 7/62* | (2017.01) |
| *G06F 16/53* | (2019.01) |
| *G06T 11/00* | (2006.01) |
| *G06Q 30/02* | (2012.01) |
| *G06N 5/04* | (2006.01) |
| *G06Q 30/06* | (2012.01) |

(52) U.S. Cl.
CPC ............... *G06T 7/62* (2017.01); *G06F 16/53* (2019.01); *G06N 5/04* (2013.01); *G06Q 30/0282* (2013.01); *G06Q 30/0643* (2013.01); *G06T 11/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,412,420 | A * | 5/1995 | Ellis ....................... | G01B 11/24 348/135 |
| 5,483,441 | A * | 1/1996 | Scofield ............... | A01K 1/0613 382/110 |
| 5,576,949 | A * | 11/1996 | Scofield ............... | A01K 1/0613 348/135 |
| 6,763,148 | B1 | 7/2004 | Sternberg et al. | |
| 6,974,373 | B2 * | 12/2005 | Kriesel ................. | A22B 5/201 452/157 |
| 7,110,572 | B1 * | 9/2006 | Benn ...................... | G01N 33/12 382/110 |
| 7,399,220 | B2 * | 7/2008 | Kriesel ................ | A01K 11/008 452/157 |
| 8,553,047 | B2 * | 10/2013 | Takamatsu ......... | G06Q 30/0603 345/589 |
| 9,142,028 | B2 * | 9/2015 | Banhazi .................... | G06T 7/60 |
| 9,241,184 | B2 | 1/2016 | Weerasinghe | |
| 9,251,591 | B2 | 2/2016 | Song et al. | |

(Continued)

OTHER PUBLICATIONS

Phoebe R. Apeagyai, Application of 3D body scanning technology to human measurement for clothing Fit, International Journal of Digital Content Technology and its Applications, vol. 4, No. 7, Oct. 2010, England, UK.

(Continued)

*Primary Examiner* — Tsung Yin Tsai
(74) *Attorney, Agent, or Firm* — Larson & Larson, P.A.; Frank Liebenow; Justin P. Miller

(57) ABSTRACT

A system for accurately determining a size of a pet includes receiving images of the pet (at least three images—front, side, and top are preferred). The system utilizes software (e.g. Artificial Intelligence) to determine a breed of the pet and base sizes of the pet, then the software further hones the base sizes by analysis of the images and, in some embodiments, data from returned merchandise. Once the size is determined, products are presented to the consumer that are in stock and available in the size of the pet. In some embodiments, images of the pet are overlaid with at least one of the products and displayed showing the product on the pet.

20 Claims, 17 Drawing Sheets

(56) References Cited

U.S. PATENT DOCUMENTS

| | | | | |
|---|---|---|---|---|
| 9,311,556 | B2* | 4/2016 | Banhazi | A01K 29/00 |
| 9,412,000 | B1* | 8/2016 | Ge | G01S 5/0289 |
| 9,655,395 | B2 | 5/2017 | Kruusmaa et al. | |
| 9,836,885 | B1* | 12/2017 | Eraker | G06Q 30/0623 |
| 9,940,727 | B2* | 4/2018 | Medioni | G01B 11/245 |
| 10,185,892 | B1* | 1/2019 | Mishra | G06K 9/66 |
| 10,249,100 | B2 | 4/2019 | Choi | |
| 10,321,728 | B1* | 6/2019 | Koh | G06T 7/11 |
| 10,366,533 | B2* | 7/2019 | Sugita | G06T 19/00 |
| 10,412,283 | B2 | 9/2019 | Send et al. | |
| 10,489,683 | B1* | 11/2019 | Koh | G06K 9/6232 |
| 2005/0257748 | A1* | 11/2005 | Kriesel | A01K 29/00 |
| | | | | 119/51.02 |
| 2006/0002553 | A1* | 1/2006 | Krien | G01B 11/22 |
| | | | | 380/245 |
| 2006/0098865 | A1* | 5/2006 | Yang | G06K 9/00362 |
| | | | | 382/159 |
| 2010/0111370 | A1* | 5/2010 | Black | G06K 9/00369 |
| | | | | 382/111 |
| 2011/0196661 | A1* | 8/2011 | Spicola | G06T 7/62 |
| | | | | 703/11 |
| 2012/0067298 | A1* | 3/2012 | Rich | A01K 23/00 |
| | | | | 119/856 |
| 2015/0092054 | A1* | 4/2015 | Saptharishi | H04N 5/23219 |
| | | | | 348/143 |
| 2015/0131868 | A1* | 5/2015 | Rooyakkers | G06F 16/5866 |
| | | | | 382/110 |
| 2016/0012278 | A1* | 1/2016 | Banhazi | G06K 9/46 |
| | | | | 382/110 |
| 2016/0171296 | A1* | 6/2016 | Ikenoue | G06K 9/00369 |
| | | | | 382/103 |
| 2017/0196196 | A1* | 7/2017 | Trottier | A01K 5/0283 |
| 2019/0172580 | A1* | 6/2019 | Boroczky | A61B 5/0035 |
| 2019/0208181 | A1* | 7/2019 | Rowell | H04N 5/23267 |
| 2020/0118173 | A1* | 4/2020 | Chu | G06K 9/00 |

OTHER PUBLICATIONS

A glimpse of 3-D body scanning technology in the apparel industry, https://www.fibre2fashion.com/industry-article/2980/a-glimpse-of-3-d-body-scanning-technology-in-the-apparel-industry.

T.Spahiu, E. Shei, and E. Piperi, Extracting body dimensions from 3D body scanning, 6th International 2, Conference of Textile, Nov. 20, 2014, Tirana, Albania.

Dr. Nicola D'Apuzzo, Recent Advances in 3D Full Body Scanning with Applications to Fashion and Apparel, Optical 3-D Measurement Techniques IX, 2009. Vienna, Austria.

Is 3D body scanning the future of fashion? by Pamela Kokoszka, The Verdict, https://www.verdict.co.uk/3d-body-scanning-fashion-future/.

Image Data Processing or Generation, in General, CPC—G06T—Aug. 2019.

* cited by examiner

SYSTEM, METHOD, AND APPARATUS FOR CLOTHING A PET

FIELD

This invention relates to the field of pets and more particularly to a system for analyzing images of a pet and selecting a pet clothing size.

BACKGROUND

Throughout the world, pets have become a part of their owner's family. It is estimated that 85 million families in the United States alone have one or more pets. Many pet owners like to adorn their pets with clothing and accessories, not only for weather, but for fashion and special occasions such as holidays. This has led to a growing pet industry, estimated at over $72 billion in 2018 (U.S. only), with around $8B of that market being online.

A large part of the pet fashion or clothing industry is online, for several reasons. For one, there is a huge variance in pet sizes. For example, in 2018, there were around 202 breeds of dogs alone according to the American Kennel Club, though some estimate are as high as 340. Each breed has its own size and shape characteristic along with typical hair length. To compound the issue even further, there are many mixes of breeds (mutts) as well. As for cats, estimates are around 45 breeds. The variations in size, hair length, and proportions makes sizing very difficult. To compound the issue even more, different pet clothing brands do not agree on standard sizes, so a size-medium from one brand is often different than a size-medium form another brand.

For humans, there are maybe around 5 shirt sizes (e.g., small, medium, large, x-large, xx-large), but for pets, such sizes are not simple. Consider two small dogs like a Miniature Dachshund (8-11 pounds) and an Affenpinscher (6-13 pounds) that both weigh 10 pounds. It is hard to believe that the same, "small," dog shirt would fit both of these animals as the Affenpinscher has a much shorter length (around 12 inches) and much longer hair than the miniature Dachshund (around 16 inches). Therefore, many more sizes of clothing are required for pets. Multiply this by many colors and styles and this creates a huge stocking issue at brick-and-mortar establishments.

Another reason why a large part of the pet fashion or clothing industry is online has to do with pet temperament. There are certain breeds or individual pets that are well behaved when visiting a pet superstore, but some are too aggressive while some are difficult to control. Some will not hold still for sizing a pet outfit.

Given the reasons above, the ideal place to buy pet fashion or clothing is online as a single marketer is able to stock or access many different sizes, colors, and styles of pet clothing. Unfortunately, because there is so much uniqueness of each pet; it is difficult to categorize the size of one's pet when ordering clothing online. In order to size a pet for an outfit, around 11 measurements must be made such as diameter of hind leg, length of hind leg, length of torso, diameter of neck, length of front leg, diameter of chest, etc. As with a human suit of clothing, the knowledge of a tailor is required to know exactly from where to where each measurement must be taken. This coupled with a total lack of cooperation from many pets makes it almost impossible to obtain proper sizing measurements.

Further, a pet outfit shown on one animal might not look as nice when it arrives and the pet owner tries that outfit on their pet.

Therefore, the online pet clothing industry is hampered by a large percentage of returns, frustrating consumers an adding shipping costs that are usually born by the online marketing company, which must increase prices to offset for these costs.

What is needed is a system that will properly size a pet for clothing and accessories.

SUMMARY

A system for accurately determining a size of a pet includes receiving images of the pet (at least three images—front, side, and top are preferred). The system utilizes software (e.g. Artificial Intelligence) to determine a breed of the pet and base sizes of the pet, then the software further hones the base sizes by analysis of the images and, in some embodiments, data from returned merchandise. Once the size is determined, products are presented to the consumer that are in stock and available in the size of the pet.

In one embodiment, a system for approximating sizes for pets is disclosed including a server computer having a database of animals operatively coupled there to. The database of animals has data related to types of animals and base sizes for each animal. A plurality of images of a pet are provided and software that runs on the server receives the plurality of images of the pet, determines which animal in the database of animals is a closest match to the images of the pet, and generates a set of size parameters based upon the base size of the animal in the database of animals that is the closest match as modified by estimates made from the images of the pet.

In another embodiment, a method of determining a size of a pet is disclosed, including receiving at least one image of the pet and determining a breed of the pet from the at least one image using an animal database and generating a base set of sizes of the pet based on the breed of the pet. The base set of sizes is then modified based upon the at least one image of the pet, thereby producing a more accurate set of sizes.

In another embodiment, a system for approximating sizes for pets is disclosed including a server computer and a database of animals operatively coupled to the server. The database of animals has data related to types of animals and base sizes for each animal in the database of animals. Images of the pet are provided (e.g. uploaded) including a side view image of the pet, a front view image of the pet, and an aerial view image of the pet. Software that runs on the server receives the images of the pet, determines which animal in the database of animals is a closest match to the images of the pet, and generates a set of size parameters based upon a starting size of the animal from the database of animals that is the closest match, the software then modifies set of size parameters by estimates made from the images of the pet.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
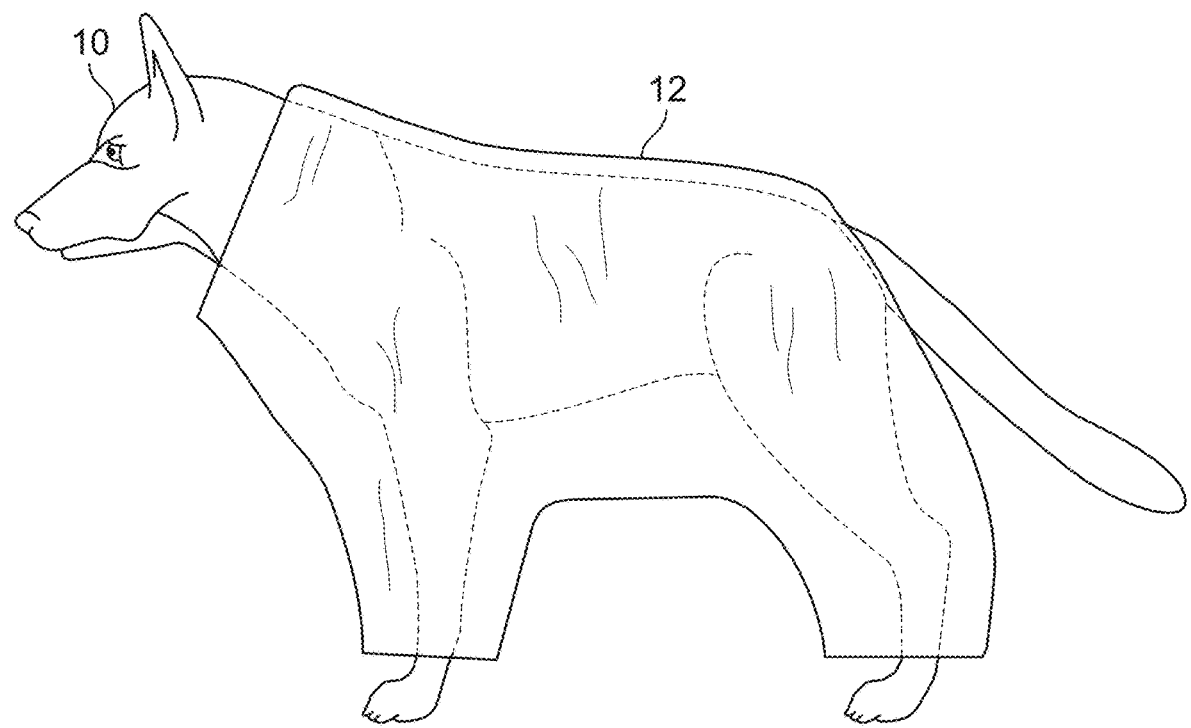
FIG. 1 illustrates a pet having received the wrong size pet outfit of the prior art.

Reference will now be made in detail to the presently preferred embodiments of the invention, examples of which are illustrated in the accompanying drawings. Throughout the following detailed description, the same reference numerals refer to the same elements in all figures.

Throughout this description, the term, "owner" describes a person who is responsible for a pet. The term, "pet" describes any animate or inanimate animal-related object or being that is possessed by the owner.

The description uses the term "imaging device" is used to describe any device that is capable of capturing an image (likeness) of a pet. Throughout this description, a smartphone or digital camera is used as an example of an imaging device, though many other devices are capable of capturing digital or film images of a pet, all of which are included herein.

Referring to FIG. 1, a pet 10 having received the wrong size pet outfit 12 of the prior art is shown. As often happens, a pet owner has ordered a pet outfit 12 and, upon delivery, the pet outfit 12 is of the wrong size or does not look good on the pet. This issue causes several problems for the pet owner and the retailer. It takes time, effort, and sometimes traveling to a shipping location for the pet owner to repackage the pet outfit 12 and ship it to the retailer. It takes employee time to listen to the pet owner, establish the issue, provide return shipping information, etc. This costs the retailer in time. The cost of return shipping is also born by either the retailer or the pet owner. When the product returns to the retailer after having been worn by the pet 10, does the retailer clean the product and sell it to another pet owner or must the product be offered as "refurbished," and sold at a reduced price? All of these costs are significant and measurable, but the cost of loss of future business should the pet owner decide that the retailer has not provided good ordering instructions or was not amicable during interactions is difficult to gauge.

Figure 2:
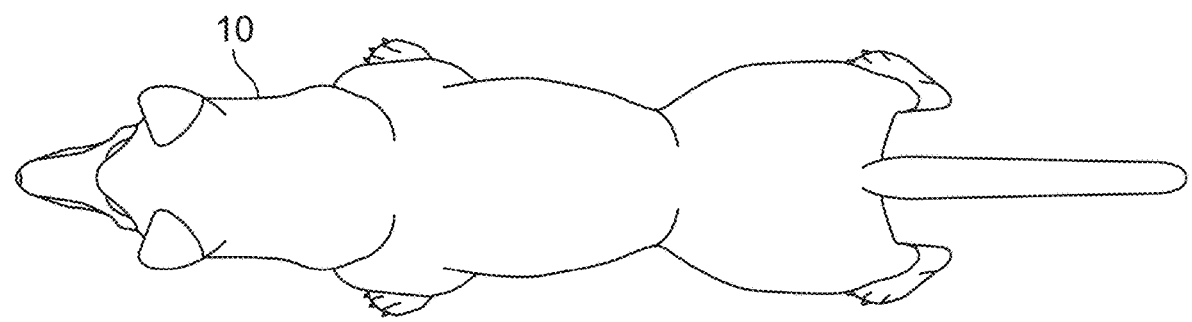
FIGS. 2-4 illustrate images of a pet taken from the top, front, and side.
Figure 3:
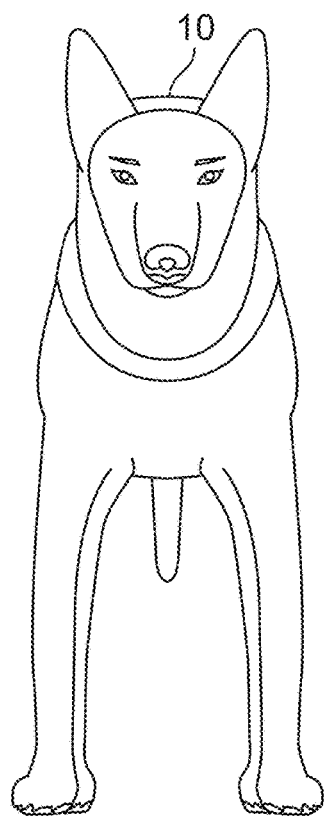
Figure 4:
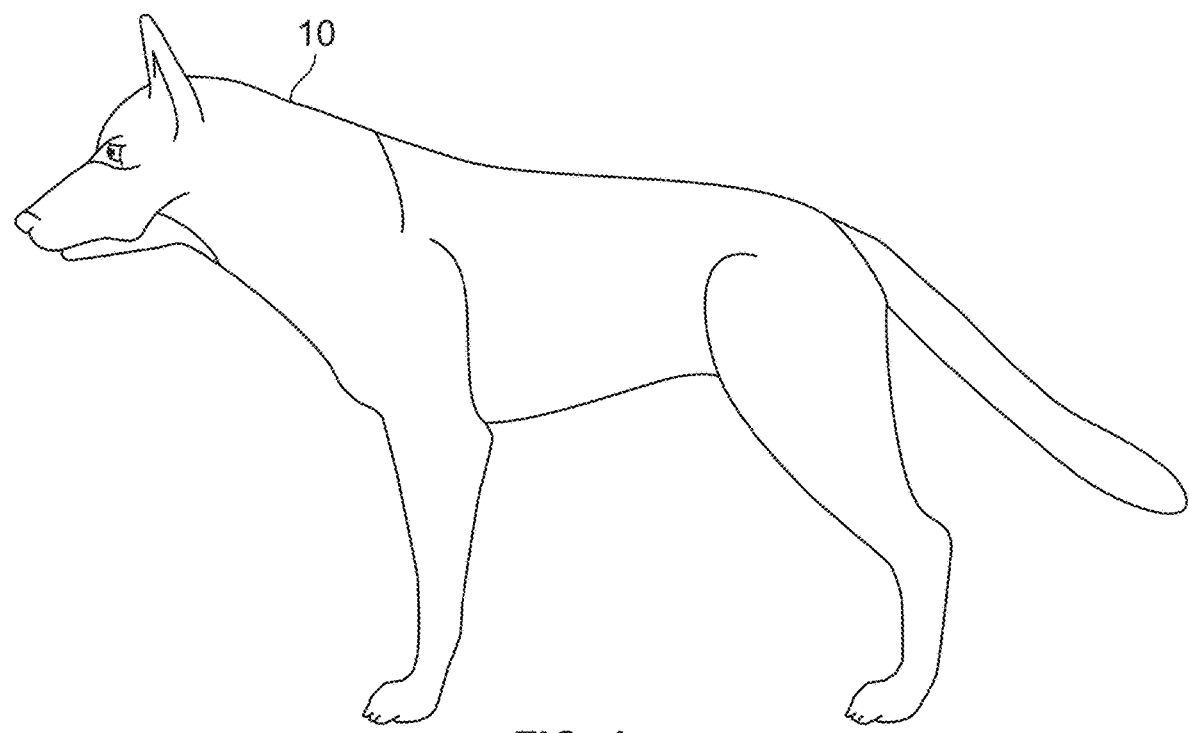

Referring to FIGS. 2-4, images of a pet 10 taken from the top, front, and side are shown. The present application requests three images of the pet 10 that are taken from the top, front, and side. These images are used to determine a proper size for any pet clothing or accessory desired by the pet owner.

As one might imagine, taking a picture of a German Shepard might result in a tiny image if taken from a great distance or with a certain lens. Therefore, camera focal length and distance from the pet 10 are important to properly determine the size of the pet 10. For proper sizing, the images are normalized to reduce variability. In some embodiments, the pet owner provides information regarding the images such as distance from the pet 10, camera specification, or specification of the imaging device 11 (e.g. smartphone manufacturer and product name/number). In some embodiments, the images include metadata that indicates camera specifications. In some embodiments, no information is available regarding the imaging device 11 and/or the distance from the pet 10 and approximations must be made by software.

Figure 4A:
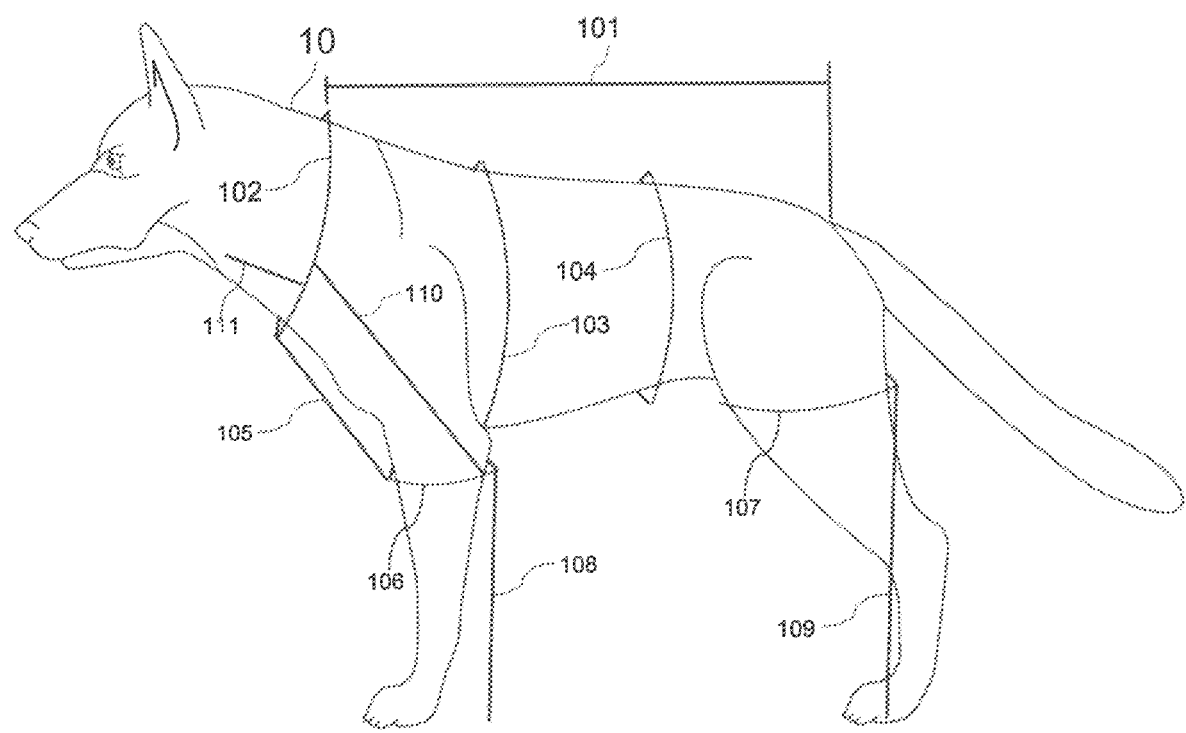
FIG. 4A illustrates a measurement diagram of the prior art.

Referring to FIG. 4A, a measurement diagram of the prior art is shown. In this, various measurement locations are shown for the pet 10. In order to size a pet for an article (e.g. a shirt), around 11 measurements must be made. These measurements often include: diameter of hind leg 107, length of hind leg 109, length of torso 101, diameter of neck 102, diameter of front leg 106, length of front leg 108, diameter of chest 103, diameter of belly 104, chest length 105, neck length 111, and neck-to-front leg distance 110.

Figure 5:
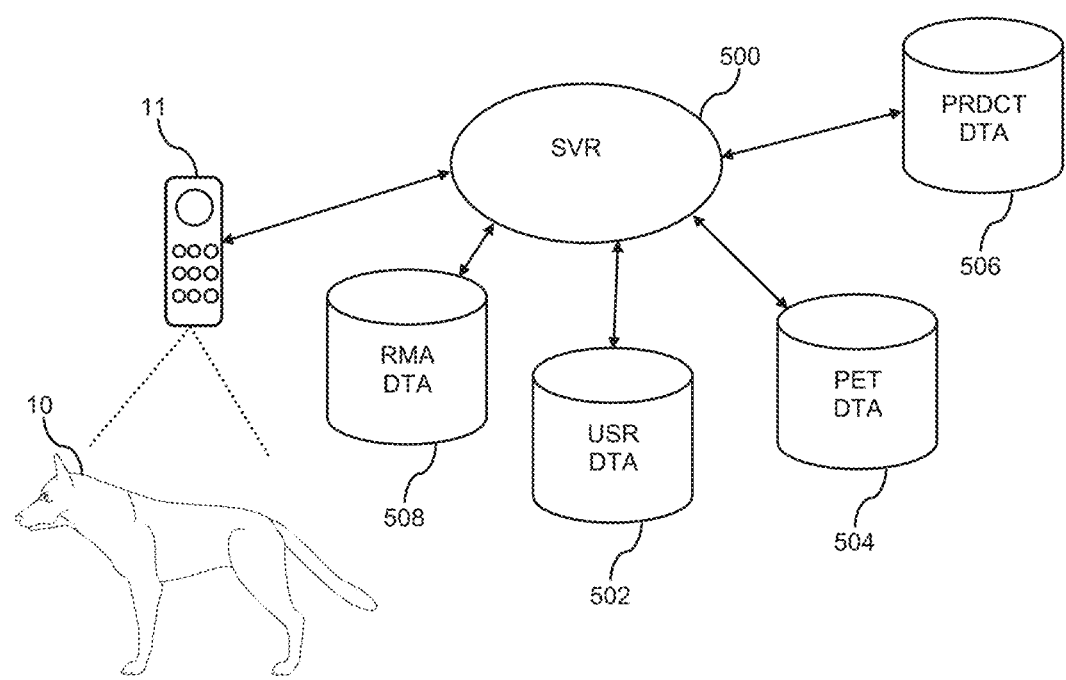
FIG. 5 illustrates a data connection diagram of the system for clothing a pet.

Referring to FIG. 5, a data connection diagram of the exemplary system for clothing a pet. In this example, one or more imaging devices 11 such as smartphones, tablet computers, cameras, etc., are employed to capture one or more pictures of a pet 10. The imaging devices 11 (e.g. smartphone) are operationally connected to a server computer 500, for example through a wireless or wired network such as the Internet. The server utilizes artificial intelligence to determine the breed, size, and approximate measurements of the pet.

User password, preferences, purchase history, etc., are stored in a user data 502 that is accessible by the server computer 500. Animal data is stored in an animal database 504 that is accessible by the server 500. The animal data provides initial data to an analysis program (artificial intelligence) for making inferences as to what animal is present in images received from the one or more imaging devices 11 (e.g. smartphone) to determine a proper clothing/accessory size of the animal (pet). By maintaining the animal data related to the pet 10, future purchase are possible without retaking the images as in FIGS. 2-4.

Product data 506 is also accessible by the server 500 for determining available products, sizes, and colors for whatever a user requests.

Figure 6:
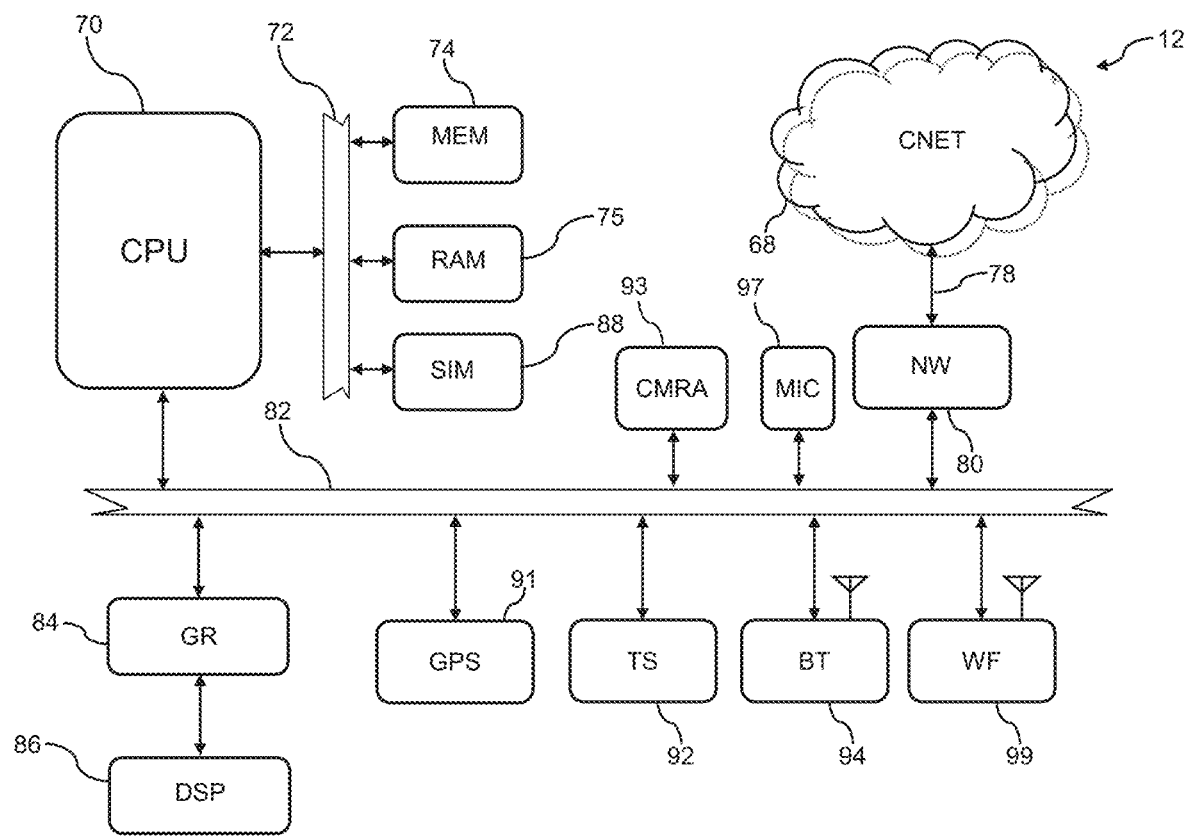
FIG. 6 illustrates a schematic view of a typical smartphone.

Referring to FIG. 6, a schematic view of a typical imaging device is shown. In this, an imaging device 11 shown being a smartphone is shown though other imaging devices such as digital cameras, tablet computers, smart-watches, smart eyewear, etc., are fully anticipated as long as the imaging device has a camera 93. Although any end-user device having or interfaced to a digital camera is anticipated, for clarity purposes, a smartphone will be used as the imaging device 11 in the remainder of the description as the smartphone includes a camera 93 as well as processing for communicating with the server 500. In embodiments using a digital camera, it is anticipated that the digital camera be connected to a smartphone or other computer for order processing and transmission of the images of the pet 10 to the server 500.

The example smartphone represents a typical device used for capturing images and/or controlling program flow in the system for clothing a pet. This exemplary smartphone is shown in one form with a sample set of features. Different architectures are known that accomplish similar results in a similar fashion and the present invention is not limited in any way to any particular smartphone system architecture or implementation. In this exemplary smartphone, a processor 70 executes or runs programs in a random-access memory 75. The programs are generally stored within a persistent memory 74 and loaded into the random-access memory 75 when needed. Also accessible by the processor 70 is a SIM (subscriber information module) card 88 having a subscriber identification and often persistent storage. The processor 70 is any processor, typically a processor designed for phones.

The persistent memory 74, random-access memory 75, and SIM card are connected to the processor by, for example, a memory bus 72. The random-access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, flash memory, read only memory, battery-backed memory, etc. In some exemplary imaging devices 11, the persistent memory 74 is removable, in the form of a memory card of appropriate format such as SD (secure digital) cards, micro SD cards, compact flash, etc.

Also connected to the processor 70 is a system bus 82 for connecting to peripheral subsystems such as a cellular network interface 80, a graphics adapter 84 and a touch screen interface 92. The graphics adapter 84 receives commands from the processor 70 and controls what is depicted on the display 86. The touch screen interface 92 provides navigation and selection features.

In general, some portion of the persistent memory 74 and/or the SIM card 88 is used to store programs, executable code, and data, etc. In some embodiments, other data is stored in the persistent memory 74 such as audio files, video files, text messages, etc.

The peripherals are examples and other devices are known in the industry such as Global Positioning Subsystem 91, speakers, microphones, USB interfaces, camera 93, microphone 97, Bluetooth transceiver 94, Wi-Fi transceiver 99, image sensors, temperature sensors, health sensors, biometric sensors, etc., the details of which are not shown for brevity and clarity reasons.

The cellular network interface 80 connects the smartphone to the cellular network 68 through any cellular band and cellular protocol such as GSM, TDMA, LTE, etc., through a wireless medium 78. There is no limitation on the type of cellular connection used. The cellular network interface 80 provides voice call, data, and messaging services to the smartphone through the cellular network 68.

For local communications, many imaging devices 11 include a Bluetooth transceiver 94, a Wi-Fi transceiver 99, or both. Such features of imaging devices 11 provide data communications between the imaging device 11 and data access points and/or other computers such as the server 500.

Figure 7:
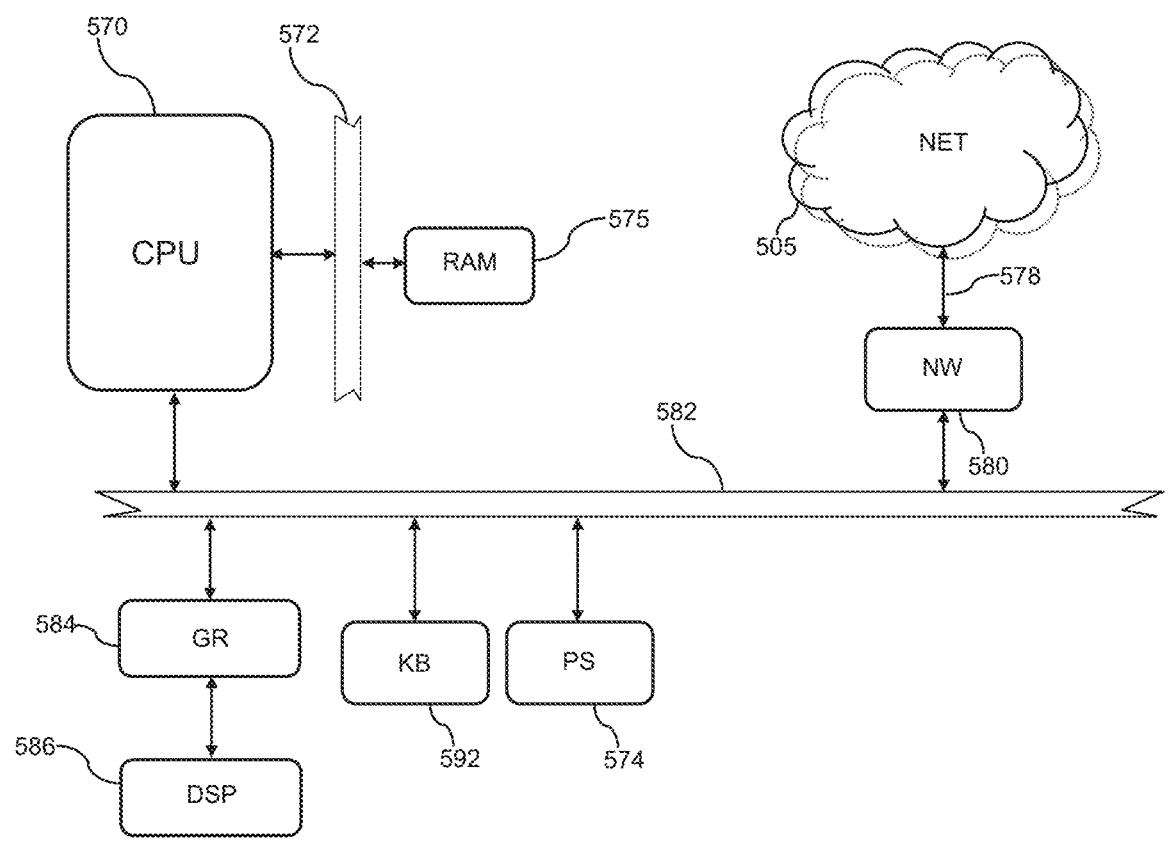
FIG. 7 illustrates a schematic view of a typical computer system such as a server or personal computer.

Referring to FIG. 7, a schematic view of a typical computer system (e.g. server computer 500) is shown. The example computer system (e.g. server computer 500) represents a typical computer system used in the system for clothing a pet for example, for calculating a size of clothing for a specific pet. This exemplary computer system is shown in its simplest form. Different architectures are known that accomplish similar results in a similar fashion and the present invention is not limited in any way to any particular computer system architecture or implementation.

Although represented as a computer system 500 having a single processor 570, it is fully anticipated that other architectures be used to obtain the same or similar results. For example, it is fully anticipated that each device 510/512/514 have integral processing capabilities and each device 510/512/514 communicates directly with each other to jointly control without the use of a computer system 500.

In the example computer system 500 of FIG. 7, a processor 570 executes or runs programs in a random-access memory 575. The programs are generally stored within a persistent memory 574 and loaded into the random-access memory 575 when needed. The processor 570 is any processor, typically a processor designed for computer systems with any number of core processing elements, etc. The random-access memory 575 is connected to the processor by, for example, a memory bus 572. The random-access memory 575 is any memory suitable for connection and operation with the selected processor 570, such as SRAM, DRAM, SDRAM, RDRAM, DDR, DDR-2, etc. The persistent memory 574 is any type, configuration, capacity of memory suitable for persistently storing data, for example, magnetic storage, flash memory, read only memory, battery-backed memory, magnetic memory, etc. The persistent memory 574 (e.g., disk storage) is typically interfaced to the processor 570 through a system bus 582, or any other interface as known in the industry.

Also shown connected to the processor 570 through the system bus 582 is a network interface 580 (e.g., for connecting to a data network 505), a graphics adapter 584 and a keyboard interface 592 (e.g., Universal Serial Bus—USB). The graphics adapter 584 receives commands from the processor 570 and controls what is depicted on a display 586. The keyboard interface 592 provides navigation, data entry, and selection features.

In general, some portion of the persistent memory 574 is used to store programs, executable code, data, and other data, etc.

The peripherals are examples and other devices are known in the industry such as pointing devices, touch-screen interfaces, speakers, microphones, USB interfaces, Wi-Fi transceivers, image sensors, temperature sensors, etc., the details of which are not shown for brevity and clarity reasons.

Referring to FIGS. 8-12, exemplary user interfaces of the system for clothing a pet are shown. Note that, with any online system, it is anticipated that each user (e.g. pet owner) register and that user is provided or creates secure credentials for later accesses of the online system. Note that such is well known in the industry and it is anticipated that, in many embodiments, such a registration and logon system is included here within.

Figure 8:
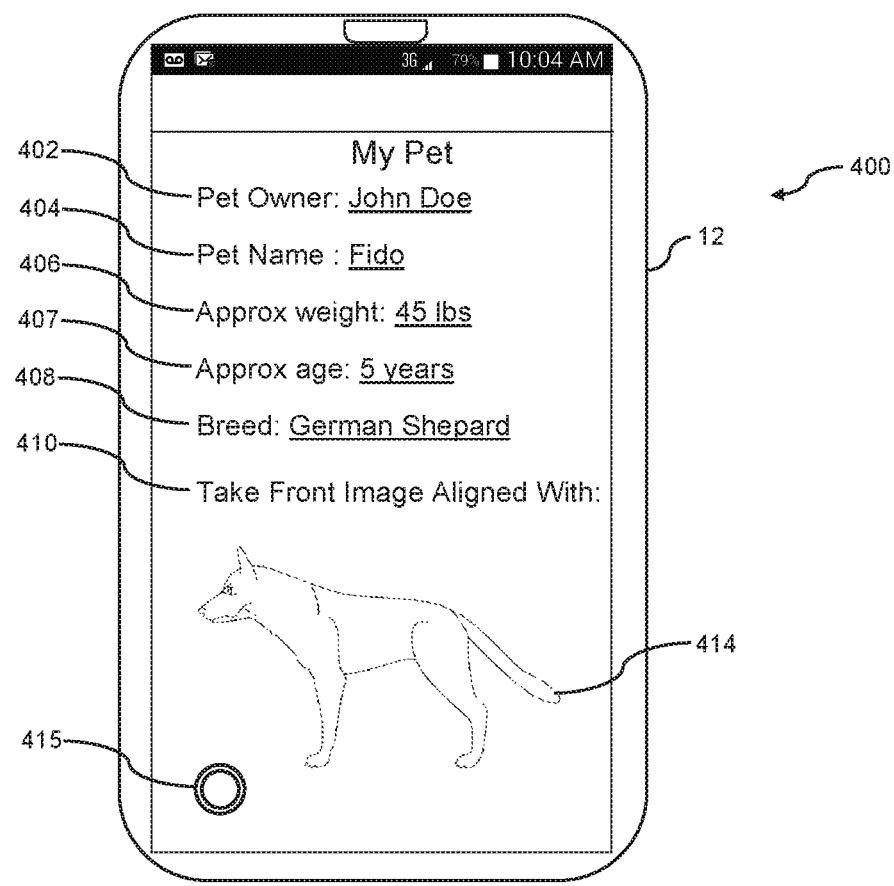
FIGS. 8, 8A, 9-12 illustrate exemplary user interfaces of the system for clothing a pet.

In FIG. 8, an example user interface 400 for adding or updated data regarding a pet 10 is shown. In this, the user (pet owner) 402 is displayed and the user (pet owner) 402 has entered the pet name 404 (e.g. "Fido"), the approximate weight of the pet 406 (e.g. 45 pounds), the approximate age of the pet 407 (e.g. 5 years), and the breed of the pet 408 (e.g. "German Shepard"), if known.

In this example, the system for clothing a pet has analyzed the data provided (e.g. the approximate weight of the pet 406, the approximate age of the pet 407, and the breed of the pet 408), as entered by the pet owner 402. The analysis generates a shadow outline 414 of an animal of that weight, age, and breed within the user interface 400 and enables the camera (e.g. the camera 93 of a smartphone). The user interface 400 requests that the pet owner 402 align a live image of the pet 10 from the camera 93 with the shadow outline 414 and then press a shutter button 415 to capture an image of the pet 10. Although any number of image files 412 is anticipated, a side view, a front view, and an aerial view (e.g. top view) are requested along with a shadow outline 414 corresponding to that view.

As it is important to normalize the image files 412 later when sizes of the pet 10 are calculated, two aspects of the images are important. The first is the focal length setting of the camera 93 (e.g. the camera of the imaging device 11). Many imaging devices 11 have variable zoom and some imaging devices 11 have multiple cameras (e.g. a wide angle camera, a normal focal length camera, and a telephoto camera). For sizing accuracy, it is important to normalize the images. For example, taking a picture of a 36" stick without zoom and from a substantial distance, the stick will appear to be only a few inches tall.

The second aspect that is important is distance from the pet 10. Given the same imaging device 11 with the same focal length/zoom setting, taking a picture of the above stick at a distance of four feet will show a much larger looking stick than taking the picture at a distance of twenty feet.

In the embodiment of FIG. 8, the images of the pet 10 are captured by the system for clothing a pet using the imaging device 11 set to no zoom and using a standard camera 93 of the imaging device. In order for the pet owner 402 to properly fill the shadow outline 414 with the image of the pet 10, the per owner must adjust the distance from a lens of the camera 93 to the pet 10, thereby, increasing/decreasing a size of the image of the pet 10 to match the shadow outline 414. After the image is captured, metadata of the image will include a type value regarding the manufactured or the imaging device 11 (e.g. Model: SM-G925V) as well as camera settings (e.g. Focal length=4 mm). In such, the system for clothing a pet utilizes the metadata to determine the resulting distance that the pet owner 402 needed to be from the pet 10 in order to fit the image of the pet within the shadow outline 414. This provides the system for clothing a pet data as to whether the pet 10 is larger or smaller than what is expected from calculations made from the approximate weight of the pet 406, the approximate age of the pet 407, and the breed of the pet 408.

Figure 8A:
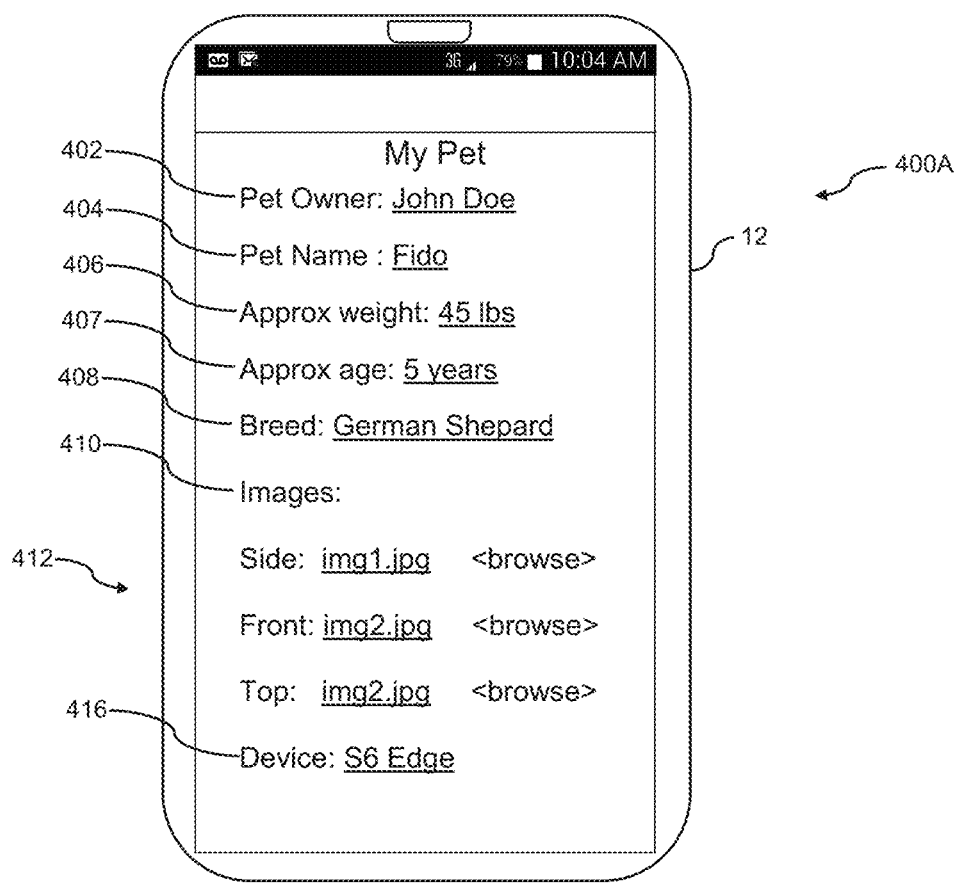

In FIG. 8A, an example user interface 400A for adding or updated data regarding a pet 10 is shown. In this, the user (pet owner) 402 is displayed and the user (pet owner) 402 has entered the pet name 404 (e.g. "Fido"), the approximate weight of the pet 406 (e.g. 45 pounds), the approximate age of the pet 407 (e.g. 5 years), and the breed of the pet 408 (e.g. "German Shepard"), if known, and image files 412 of the pet. Although any number of image files 412 are anticipated, in this example, a side view, a front view, and an aerial view (e.g. top view) are requested and have been uploaded by the user (pet owner) 402.

As it is important to normalize the image files 412 later when sizes of the pet 10 are calculated, two aspects of the images are important. The first is the focal length setting of the camera 93 (e.g. the camera of the imaging device 11). Many imaging devices 11 have variable zoom and some imaging devices 11 have multiple cameras (e.g. a wide angle camera, a normal focal length camera, and a telephoto camera). For sizing accuracy, it is important to normalize the images. For example, taking a picture of a 36" stick without zoom and from a substantial distance, the stick will appear to be only a few inches tall.

The second aspect that is important is distance from the pet 10. Given the same imaging device 11 with the same focal length/zoom setting, taking a picture of the above stick at a distance of four feet will show a much larger looking stick than taking the picture at a distance of twenty feet.

Therefore, when capturing the image files 412 of the pet 10, guidelines are provided as to how far the imaging device 11 should be from the pet 10 and what settings should be made to the imaging device 11 (e.g. no zoom, standard camera). As different imaging devices 11 often have different standard focal lengths, in some embodiments, a manufacture and/or product name 416 of the imaging device 11 is captured and used to determine the focal length of the imaging device 11. In some embodiments, metadata of the image files 412 include a type value regarding the manufactured or the imaging device 11 (e.g. Model: SM-G925V) as well as camera settings (e.g. Focal length=4 mm). In such embodiments, there is no need for the user to enter the manufacture and/or product name 416 as such is known from the metadata included with each image file 412.

In some embodiments, it is anticipated that if the system for clothing a pet recognizes a difficulty with a specific size parameter, the system for clothing a pet prompts for one or more specific measurements (e.g. through a user interface not shown for clarity and brevity) such as any or all of the measurements 101/102/103/104/105/106/107/108/109/110/111 as shown in FIG. 4A.

Figure 9:
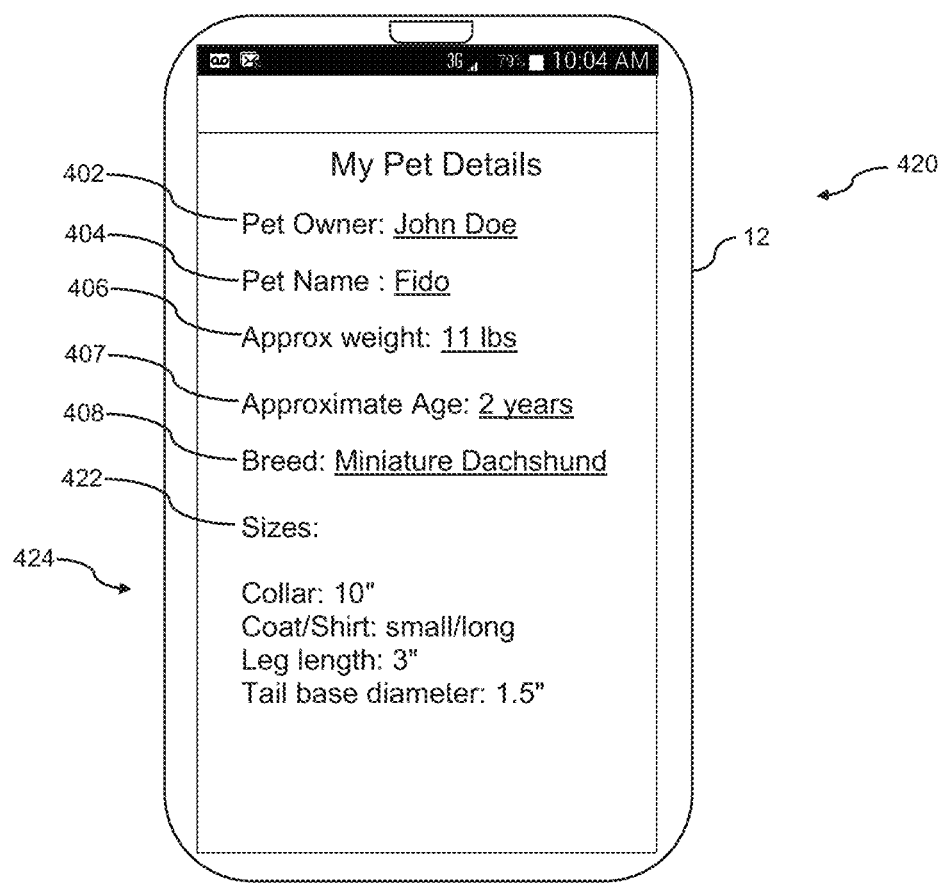

In FIG. 9, a size results user interface 420 is shown. In this, the image files 412 and data provided by the user (pet owner) 402 have been analyzed to determine various size parameters 424, for example, the collar length, coat/shirt size, leg length, and tail base diameter. In this user interface, in some embodiments, it is anticipated that the user (pet owner) 402 is able to adjust the size parameters 424 to match individual measurements that the user (pet owner) 402 has taken. For example, if the user (pet owner) 402 has measured the neck of the pet 10 and has determined that the circumference is 11"; then the collar size is overwritten to 11".

In some embodiments, the size parameters 424 are used to manufacture a custom article for the pet 10, for example, a custom shirt that matches the size parameters 424 (e.g. length of torso 101, diameter of neck 102, diameter of chest 103, diameter of belly 104, chest length 105) better than what is available pre-made.

Figure 10:
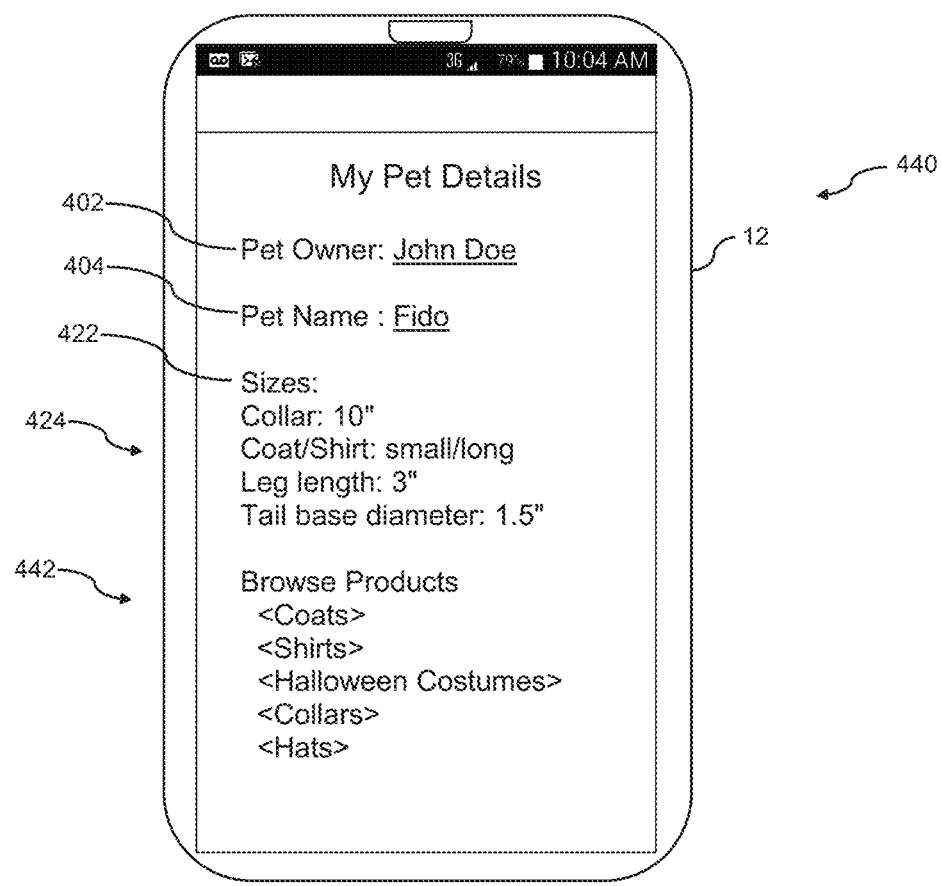
Figure 11:
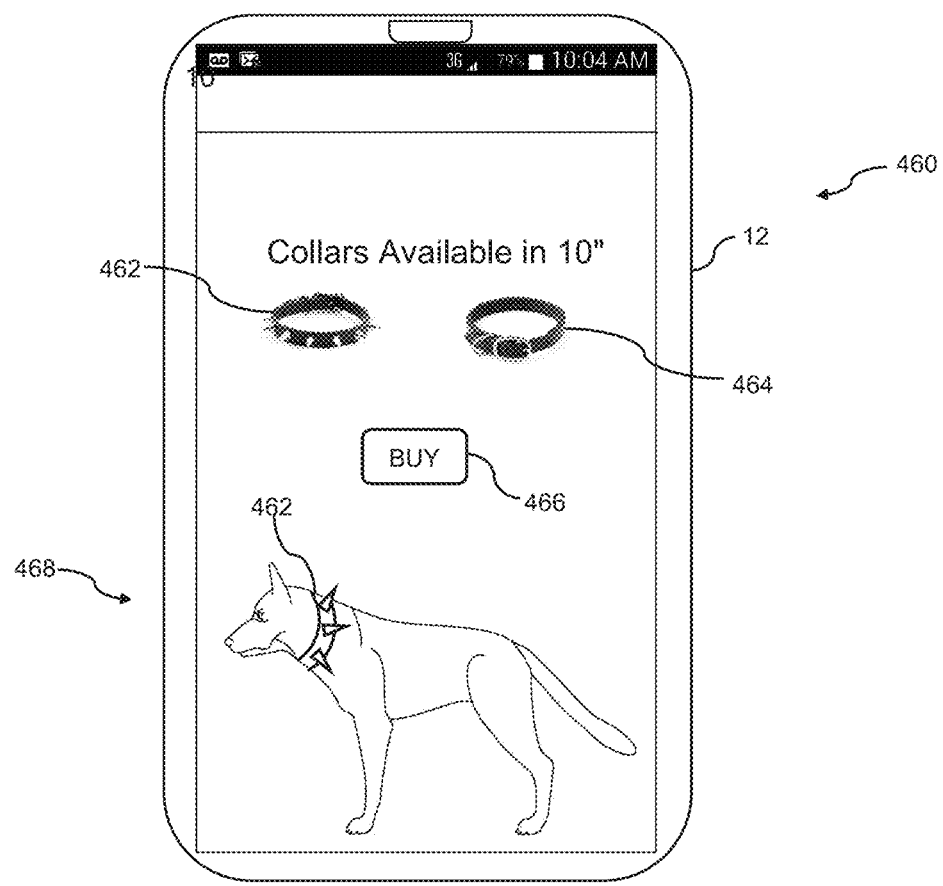

In FIG. 10, a product browsing user interface 440 is shown. In this, the size parameters 424 garnered from the image files 412 (the collar length, coat/shirt size, leg length, and tail base diameter) are displayed along with links 442 to order various pet accessories for this pet 10 such as coats, shirts, Halloween costumes, collars, and hats. For simplicity, only collars are selected and the collar availability page 460 of FIG. 11 is displayed. In this, two pet collars 462/464 are shown for purchase for this particular pet 10. Note that it is anticipated that the selection of such articles (collars in this example) is anticipated to be limited only to those articles that will fit the particular pet 10. For example, it another collar is available, but only in 6" lengths, that collar is not displayed as ordering of such will result in a return as a 6" collar will not fit on this particular pet.

It is now shown that the user (pet owner) 402 has selected a first of the pet collars 462/464 and an image of the pet 10 is displayed wearing the pet collar 462 that was selected. If the user (pet owner) 402 is happy with how the pet collar 462 looks, the user (pet owner) 402 selects the buy icon 466 to purchase this pet collar 462. Note that user interfaces for completion of the purchase are well known in the industry (e.g. capturing shipping and payment details) and not included here within for brevity and clarity reasons.

Figure 12:
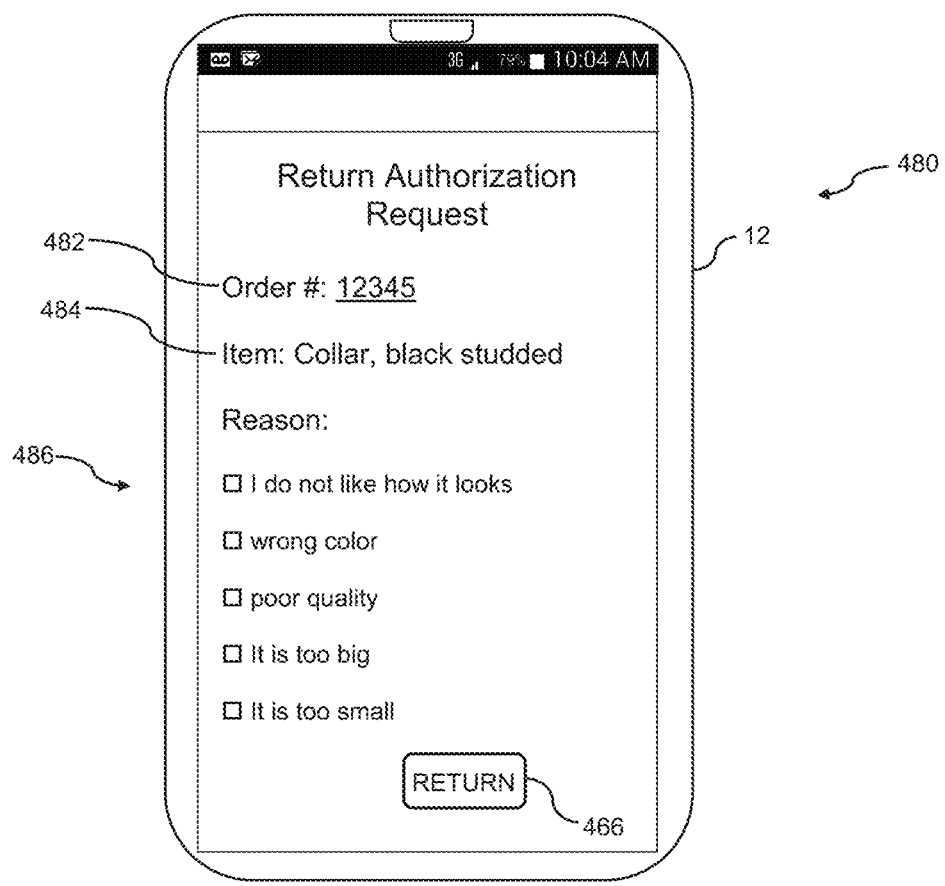

It is anticipated that the articles purchased will fit the pet 10 based upon the sizing calculations made from data regarding the pet 10 and the image files 412. Even with such, some number of returns is anticipated, some due to non-size-related reasons and some due to size-related reasons. In FIG. 12, a return authorization request user interface 480 is shown. As with any return request, the user (pet owner) 402 needs to identify what is being returned, for example, by order number 482 and item description 484. The return authorization request user interface 480 then requires the user (pet owner) 402 enter a reason for return 486. Although the reason for return 486 often provides valuable marketing information, reasons having to do with size (e.g. "it is too big" or "it is too small") provide important feedback to the sizing engine as will be discussed with FIG. 13.

Figure 13:
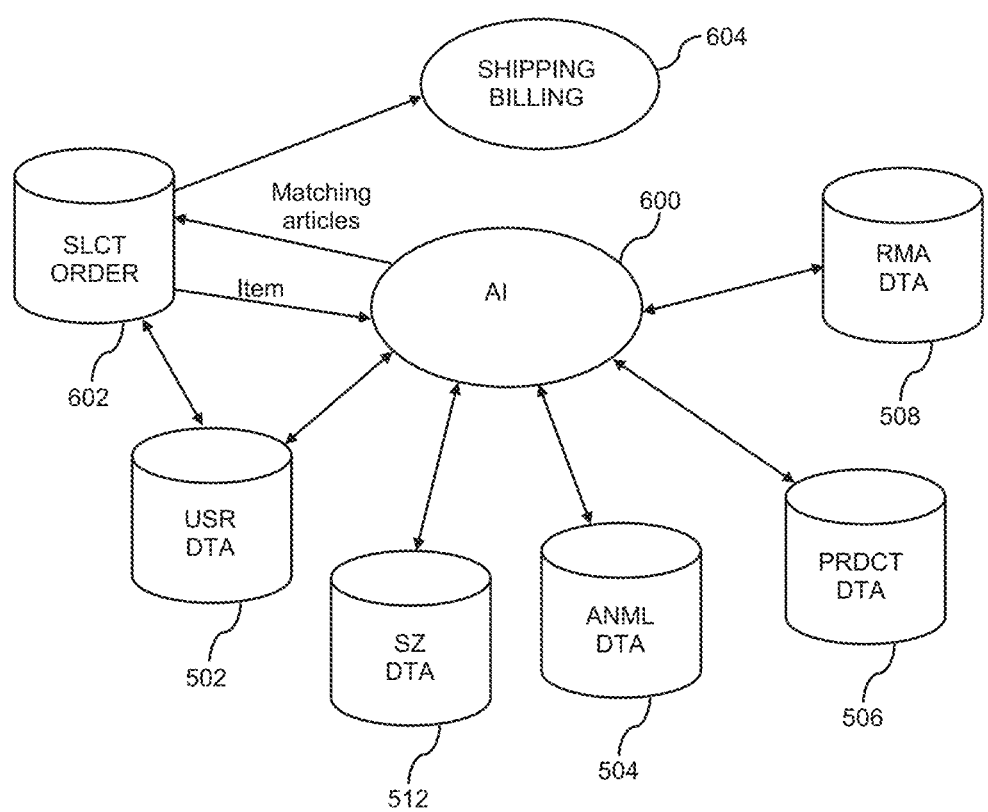
FIG. 13 illustrates a computational diagram of the system for clothing a pet.

Referring to FIG. 13, a computational diagram of the system for clothing a pet is shown. In this, a sizing engine 600 (e.g. a heuristic or artificial intelligence system) receives user data 502 that includes image files 412 of the pet 10 and any additional data that is provided by the user (pet owner) 402 such as the breed of the pet 408, age of the pet 407, and approximate weight of the pet 406, if available. The sizing engine 600 consults the animal database 504 for knowledge related to various possible pets, narrowing the field down to a particular pet breed or mixed breed using the image files 412. The sizing engine 600 normalizes the image files 412 using the pet breed or mixed breed as certain size ranges are expected for certain breeds/mixes, generating a base set of sizes for the pet. The sizing engine 600 now generates size data 512 for the pet 10 based upon the base set of sizes as modified by features from the image files 412. In some embodiments, historical return product (RMA) data 508 is also used by the sizing engine 600 as the sizing engine 600 generates size data 512 for the pet 10. For example, if the sizing engine 600 historically generated a certain size for a certain breed of animal and there were a statistically significant number of returns indicating that the purchased article was too small, then the sizing engine will bias the generated size slightly larger. For example, the sizing engine generates size data 512 that indicates a size of medium, but at the high range of medium, for a particular pet 10 of a certain breed. Next, the sizing engine consults the historical return product (RMA) data 508 and finds that a statistically significant number of returns for shirts and coats of this breed have been returned because the article was too small; the sizing engine will consider such feedback and, in some circumstances, increase the size in the size data 512 from medium to large.

When the user (pet owner) 402 is selecting/ordering items 602, the sizing engine 600 is consulted to properly determine which articles are available in an appropriate size for the pet 10. In this, product data 506 includes sizing parameters (e.g. some or all of diameter of hind leg 107, length of hind leg 109, length of torso 101, diameter of neck 102, diameter of front leg 106, length of front leg 108, diameter of chest 103, diameter of belly 104, chest length 105, neck length 111, and neck-to-front leg distance 110 as per FIG. 4A). This product sizing data is consulted and for each product, a comparison is made to the size data 512 to determine which articles are available in a certain class of articled (e.g. "collars") that will be best fits for the pet 10. The sizing engine 600 then returns and displays a subset of these articles that will likely fit the pet 10. Without such estimations, the prior art presented products to users (pet owners) that, in some cases, will not fit the pet 10.

In some embodiments, the selecting/ordering items 602 consults the user data 502 to retrieve an image of the pet 10 and overlay an image of a selected product onto the image of the pet 10 to show the user (pet owner) 402 approximately what the article will look like when donned by the pet 10.

The user (pet owner) 402 then selects an article and orders the article. After the user (pet owner) 402 is finished selecting articles, the user (pet owner) 402 completes the order process using an order/shipping engine 604.

Figure 14:
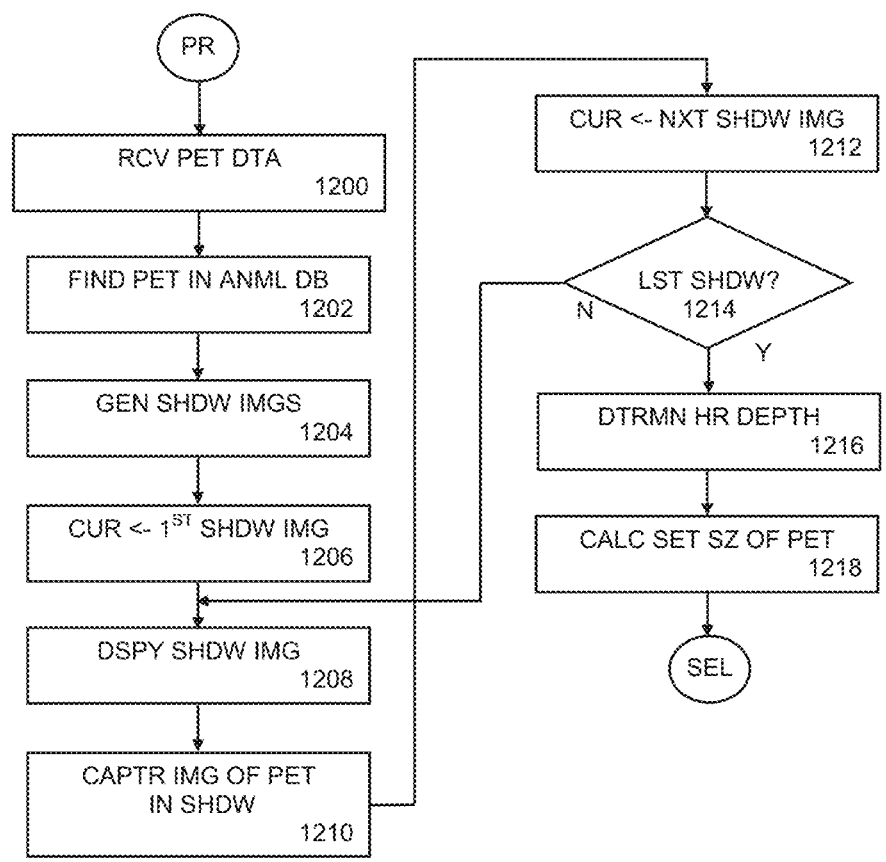
FIGS. 14, 14A, 15, and 16 illustrate exemplary program flows of the system for clothing a pet.
Figure 15:
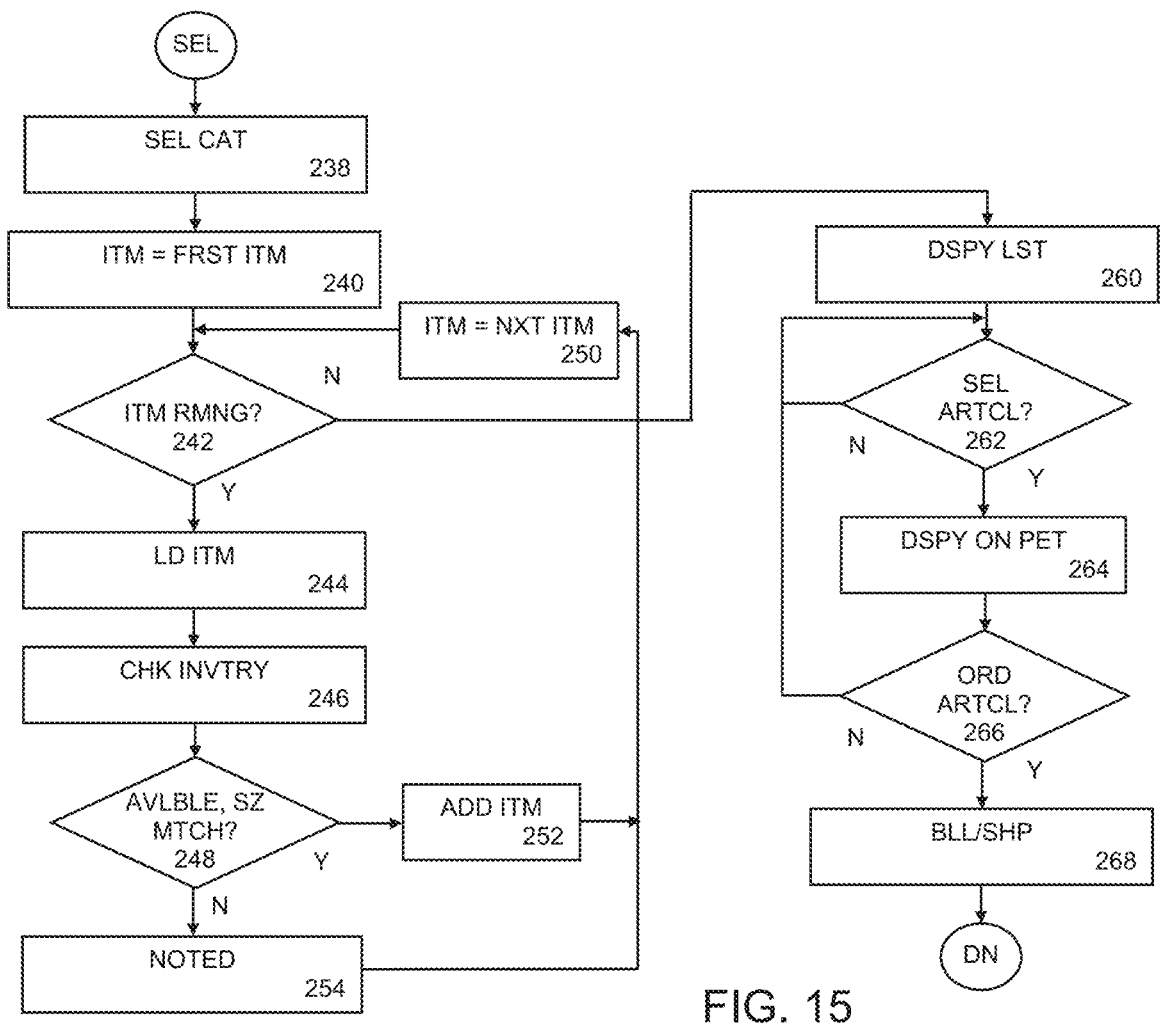
Figure 16:
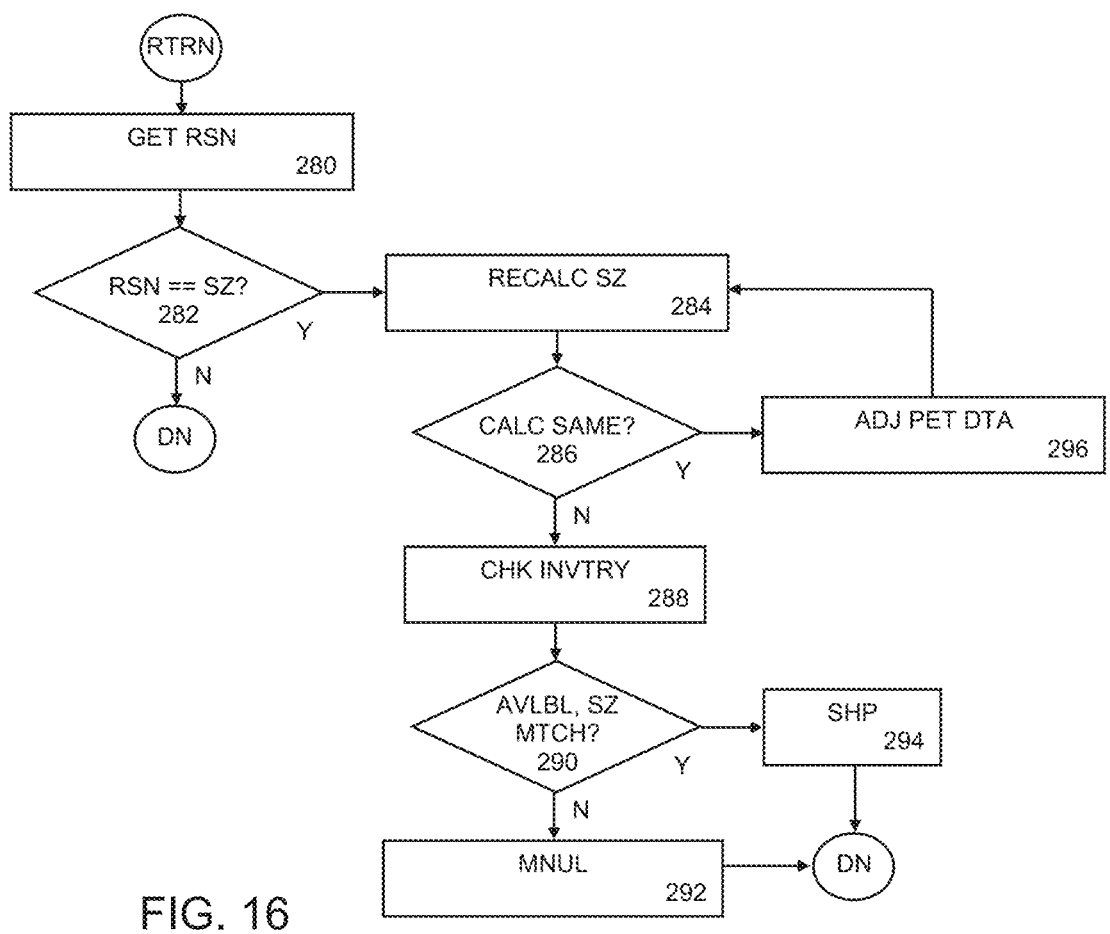

Referring to FIGS. 14-16, exemplary program flows of the system for clothing a pet 10 are shown. The program flows shown are greatly simplified for brevity and clarity. For example, the initial account generation and data entry regarding a pet 10 is not shown.

Therefore, the program flow of FIG. 14 starts with receiving 1200 data regarding the pet 10 (e.g. the approximate weight of the pet 406, the approximate age of the pet 407, and the breed of the pet 408). Now the animal database is searched 1202 to find the closest match to the data regarding the pet 10, thereby providing a matching animal. From the matching animal, a set of shadow outline 414 are generated 1204.

Now, the first shadow outline 414 is selected as the current shadow outline 1206 and a loop starts by displaying 1208 the shadow outline 414 and capturing 1210 an image of the pet 10 such that the pet aligns as best as possible with the shadow outline 414 that is displayed. In this way, assuming the pet owner 402 does not use zoom (as required), the pet owner 402 must move closer or farther away from the pet 10 to fit the pet within the shadow outline 414 that is displayed. In doing so, when capturing 1210 the image of the, distance data is also captured in metadata of the image of the pet and the metadata includes the distance at which the image was captured. The loop continues with selecting 1212 the next shadow outline 414 as the current and if this is not the last 1214 shadow outline 414, repeating.

If this is the last 1214 shadow outline 414, in some embodiments, a hair depth of the pet 10 is determined 1216. Hair length is important as many breeds have ranges of hair depth from short, flat laying hair to curly hair. Likewise, some pets 10 such as miniature poodles are often partially shaved, especially during summer months. A coat that would fit a miniature poodle that has fully grown, curly hair would likely not fit the same miniature poodle after it has been shaved.

Next, a set of size parameters for the pet are calculated 1218, preferably using a sizing engine (see FIG. 13), that preferably uses some level of artificial intelligence. In some embodiments, a base set of sizes for the matching animal are modified based upon calculations from the images of the pet 10 and in some embodiments, from the hair depth of the pet 10, and in still some embodiments, from data captured during the process of return product authorization.

The set of size parameters for the pet include some or all of pet height, pet length, tail length (or no tail), tail base diameter, front leg height, front leg diameter, rear leg height, rear leg diameter, neck circumference at collar location, chest circumference, front chest height, chin height above the collar location. From the set of size parameters for the pet, in some embodiments, standard sizes are also determined/generated such as shirt size (small, medium, large, extra-large, XXLG, etc.), coat size (small, medium, large, extra-large, XXLG, etc.), collar size (length), etc.

Figure 14A:
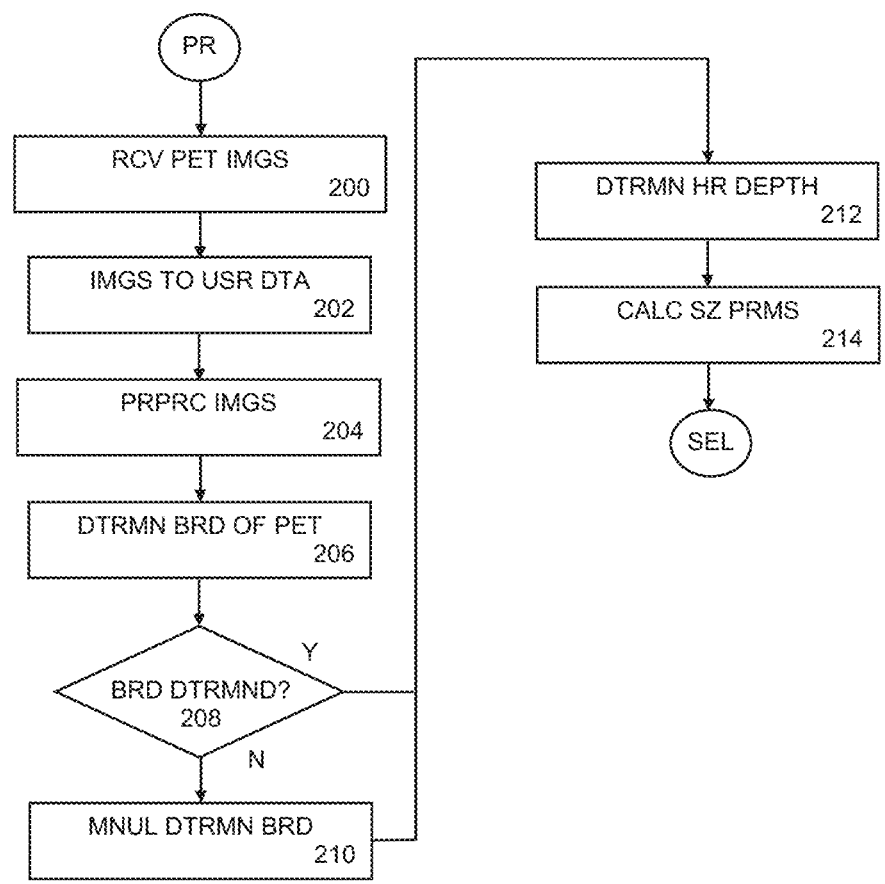

The program flow of FIG. 14A starts with receiving 200 image files 412 of the pet 10, either the images captured with the shadow outline 414 as per FIG. 8 or uploaded as per FIG. 8A. The image files 412 are then stored 202 in the user data 502 for future use in generating size estimations for the pet 10 and/or for showing the user (pet owner) 402 what a selected article will look like by overlaying that article onto an image of the pet 10 from the image files 412.

Now the image files 412 are preprocessed 204 to recognize the portion of each image file 412 that is the pet 10 as opposed to background.

Next a breed of the pet 10 is determined 206 (e.g. "German Shepard") if not entered by the pet owner 402. In some embodiments, if the software cannot determine 208 the breed of the pet 10, then a manual determination of the breed 210 is employed such as asking the user (pet owner) 402 or displaying the images and having a person look at the images to manually determine the breed 210.

Next, in some embodiments, a hair depth of the pet 10 is determined 212. Hair length is important as many breeds have ranges of hair depth from short, flat laying hair to curly hair. Likewise, some pets 10 such as miniature poodles are often partially shaved, especially during summer months. A coat that would fit a miniature poodle that has fully grown, curly hair would likely not fit the same miniature poodle after it has been shaved.

Next, size parameters are calculated 214, preferably using a sizing engine (see FIG. 13), preferably using some level of artificial intelligence. The size parameters include some or all of pet height, pet length, tail length (or no tail), tail base diameter, front leg height, front leg diameter, rear leg height, rear leg diameter, neck circumference at collar location, chest circumference, front chest height, chin height above the collar location. From the size parameters, standard sizes are also determined/generated such as shirt size (small, medium, large, extra-large, XXLG, etc.), coat size (small, medium, large, extra-large, XXLG, etc.), collar size (length), etc.

In FIG. 15, one way for a user (pet owner) 402 to select an article for purchase is shown. This starts with the user (pet owner) 402 selecting 238 a category (e.g. collars as in FIG. 11).

All items in the category that are available and will fit the pet 10 are displayed. Note, for brevity and clarity reasons, multi-page displays are not shown, though it is anticipated that more items than can be displayed on a single page will result and pagination will be required, as known in the industry.

The first item 240 in that category is selected. If there are no items remaining (assuming one or more items have been added to the list, the items are displayed 260.

If more items remain 242, the current item (ITM) is loaded 244 and inventory is checked 246 to determine if the item is available and is available in the size needed for the pet 10. If the item is available 248 in a size needed for the pet 10, the item is added to a list 252, the next item is selected 250 and the above repeats.

If the item is not available 248 or not available 248 in a size needed for the pet 10, in some embodiments the missed opportunity is noted 254 for marketing purposes to warn about low inventory levels against demand.

After the list of items is displayed 260, the program waits 262 for the user (pet owner) 402 to select one of the articles. After the user (pet owner) 402 selects one of the articles, that article is displayed 264 on an image of the pet 10 (as shown in FIG. 10) then a determination of whether the user (pet owner) 402 wants to order the item is made. If the user (pet owner) 402 does not want to order 266 the item, flow continues to display allow selection of another article. Note that it is fully anticipated that other operations are performed such as going back to the categories, going to a different page of the current category, reviewing details of an article, etc.

If the user (pet owner) 402 wants to order 266 the item, billing and shipping operations are performed 268. Note that in some embodiments, multiple items/articles are added to an order before billing and shipping are performed 268.

In FIG. 16, part of the return material process is shown. As known in the industry, returns are often made for online purchases. In such, details of the order, products being returned, address of the user (pet owner) 402, etc. are obtained before the item/article(s) is/are returned. FIG. 16 is but a part of the return material process in which the user (pet owner) 402 provides feedback as to why the return is being made. The user (pet owner) 402 has entered or said a reason 280 for the return. If the reason is size 282, then a recalculation 284 is made of the size of the pet 10. If the recalculation 284 results in the same size 286, the pet data is adjusted 296 and the recalculation 284 and test for the same size 286 is repeated. For example, if the size of the article shipped is medium and the user (pet owner) 402 indicates that the size is too small, the pet data is adjusted to increase some input data to the sizing engine until the sizing engine emits a larger size (e.g. large). In this way, if the same animal or similar animal is sized in the future, a size closer to the real size of the animal will be determined.

Once the test for the same size 286 indicates a size change, the inventory is checked 288 and if the item/article is available in the new size 290, it is shipped 294. If the item/article is not available in the new size 290, a manual process (or in some embodiments, automatic process) 292 runs to provide return shipping information and to provide a credit for the cost of the item/article.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for approximating sizes for pets, the system comprising:
    a server computer;
    a database of animals operatively coupled to the server, the database of animals having data related to types of animals and base sizes for each animal in the database of animals;
    a plurality of images of a pet and data regarding the pet; and
    software that runs on the server receives the plurality of images of the pet and the data regarding the pet, and the software selects an animal in the database of animals that is a closest match to the data regarding the pet, and the software generates a set of size parameters based upon the base size of the animal from the database of animals as modified by estimates made from the images of the pet.

2. The system of claim 1, wherein the plurality of images of the pet comprise three images, a first image of the plurality of the images of the pet is a side view of the pet, a second image of the plurality of the images of the pet is a front view of the pet, and a third image of the plurality of the images of the pet is an aerial view of the pet.

3. The system of claim 1, wherein the software that runs on the server selects the animal in the database of animals that is the closest match to the data regarding the pet and generates one or more shadow outlines of the animal, then software running on an imaging device sequentially displays each of the one or more shadow outlines and enables a camera of the imaging device to take an image of the pet such that an image of the pet aligns with the each of the one or more shadow outlines; and each image of the pet is uploaded to the server.

4. The system of claim 1, wherein the software that runs on the server further selects and display at least one article that is of an appropriate size based upon the size parameters of the pet and size data for the article.

5. The system of claim 4, wherein the software that runs on the server further presents one of the plurality of the images showing the article donned on the pet.

6. The system of claim 1, wherein the software that runs on the server uses artificial intelligence to determine which animal in the database of animals is the closest match to the data regarding the pet and generates the set of size parameters based upon the starting size of the animal in the database of animals that is the closest match as modified by estimates made from the images of the pet.

7. The system of claim 3, wherein the software that runs on the server uses metadata from the images of the pet to normalize the images based upon the imaging device used to capture the images of the pet, the metadata comprising of a model and at least one setting of a device used to capture the images of the pet.

8. A method of determining a size of a pet comprising:
receiving at least one image of the pet;
determining a breed, weight, and age of the pet;
searching a database of animals for one animal that is closes to the pet and generating a base set of sizes of the pet using data regarding the one animal from the database of animals; and
modifying the base set of sizes based upon the at least one image of the pet, thereby producing a set of sizes for the pet.

9. The method of claim 8, wherein the step of searching includes searching the database of animals and comparing the breed, weight, and age of the pet to the database of animals, selecting the one animal from the database of animals based upon the breed, weight, and age of the pet.

10. The method of claim 8, wherein the step of searching includes searching the database of animals and comparing the at least one image of the pet to the database of animals, selecting the one animal from the database of animals based upon the at least one image of the pet.

11. The method of claim 8, wherein the step of modifying includes modifying the base set of sizes with estimates made from the images of the pet and further includes the step of requesting specific size measurements and further modifying the base set of sizes with the specific size measurements, creating the set of sizes for the pet.

12. The method of claim 10, wherein the step of generating further includes modifying the set of sizes for the pet by return product feedback data.

13. The method of claim 8, further comprising, after the step of modifying, searching a database of articles that include records having similar sizes to the sizes for the pet and displaying at least one article in which a corresponding record has a similar size as the set of sizes for the pet.

14. The method of claim 13, wherein the step of displaying further includes displaying one of the plurality of images showing one of the at least one article donned on the pet.

15. The method of claim 8, wherein the step of modifying further comprises reading of a metadata of at least one of the images of the pet and normalizing the at least one of the images of the pet based upon the metadata, the metadata comprising of a model and at least one setting of a device used to capture the at least one of the images of the pet.

16. A system for approximating sizes for pets, the system comprising:
a server computer;
a database of animals operatively coupled to the server, the database of animals having data related to types of animals and base sizes for each animal in the database of animals;
an imaging device having a camera;
software running on the imaging device acquires data regarding the pet and sends the data regarding the pet to the server;
software running on the server receives the data regarding the pet and searches the database of animals for a matching animal, the software running on the server then sends at least one shadow outline of the matching animal to the imaging device;
responsive to receiving the at least one shadow outline, the software running on the imaging device sequentially displays each of the at least one shadow outline, enables the camera, the camera captures an image of the pet corresponding to a current of the at least one shadow outline;
software running on the imaging device sends the images of the pet to the server; and
software that runs on the server receives the images of the pet, and generates a set of size parameters for the pet based upon a starting size of the matching animal from the database of animals, the software then modifies set of size parameters for the pet by estimates made from the images of the pet along with metadata from the images of the pet.

17. The system of claim 16, wherein the software that runs on the server modifies the set of size parameters for the pet by estimates made from the images of the pet as further modified by return product feedback data.

18. The system of claim 16, wherein the software that runs on the server further searches a database of articles for at least one article in which the at least one article will fit the pet based upon the size parameters of the pet and the software that runs on the server forwards the at least one article that will fit the pet to the imaging device for display.

19. The system of claim 18, wherein the software that runs on the imaging device further displays one of the plurality of the images of the pet showing the one of the at least one article that will fit the pet donned on the pet.

20. The system of claim 16, wherein the software that runs on the server uses artificial intelligence to generate the set of size parameters of the pet based upon the starting size of the matching animal in the database of animals as modified by estimates made from the images of the pet in view of metadata from the images of the pet, the metadata comprising of a model and at least one setting of a device used to capture the images of the pet.

* * * * *